United States Patent [19]
Dill

[11] Patent Number: 6,006,776
[45] Date of Patent: Dec. 28, 1999

[54] INTEGRATED DRIVE GENERATOR RECIRCULATION VALVE WITH FEEDBACK CONTROL

[75] Inventor: William T. Dill, Rockford, Ill.

[73] Assignee: Sundstrand Corporation, Rockford, Ill.

[21] Appl. No.: 08/630,301

[22] Filed: Apr. 10, 1996

[51] Int. Cl.[6] .................................................. F16K 11/10
[52] U.S. Cl. ......................... 137/109; 137/597; 417/286
[58] Field of Search .................... 137/109, 111, 137/112, 114, 118.06, 597; 417/286

[56] References Cited

U.S. PATENT DOCUMENTS

| | | | |
|---|---|---|---|
| 3,561,327 | 2/1971 | Stremple | 137/111 |
| 3,769,790 | 11/1973 | Thebert | 60/39.08 |
| 4,187,871 | 2/1980 | Hendrickson | 137/112 |
| 4,467,825 | 8/1984 | Boyd | 137/112 |
| 4,891,934 | 1/1990 | Huelster | 60/39.08 |
| 4,909,354 | 3/1990 | Fluegel | 184/6 |
| 4,962,829 | 10/1990 | Sugden | 184/6.23 |
| 5,289,843 | 3/1994 | Smith | 137/118.06 |
| 5,588,503 | 12/1996 | Rinaldo | 137/112 |

*Primary Examiner*—Stephen M. Hepperle
*Attorney, Agent, or Firm*—Antonelli, Terry, Stout & Kraus

[57] ABSTRACT

A fluid circulation system in accordance with the invention includes a first fluid utilizing device (12) requiring a minimum fluid flow having an input (14) for receiving the minimum flow and an output (16) for discharging fluid received from the input; a second fluid utilizing device (24) having an input (26) for receiving fluid and an output (31) for outputting fluid; and a valve (80) having a first input (32) for receiving the fluid flow flowing from the output of the second device, a first output (36) for supplying the minimum fluid flow to the first device, a second input (34) for receiving the fluid flow flowing from the output of the first device and a second output (38) for supplying the fluid flow to the second device wherein any deficiency in fluid flow below the first fluid flow flowing from the first input to the first output is supplied with additional fluid flow (102) from the second input to the first output with any remaining fluid flow (104) from the second input flowing from the second output.

23 Claims, 7 Drawing Sheets

INTEGRATED DRIVE GENERATOR RECIRCULATION VALVE WITH FEEDBACK CONTROL

This invention was made with Government support under prime contract F33657-81-C-0067 awarded by the Department of Defense. The Government has certain rights in this invention.

TECHNICAL FIELD

The present invention relates to fluid circulation systems and methods of operation thereof and a fluid control valve in which fluid flow is controlled by the valve from two fluid sources to provide a minimum fluid flow to a primary outlet which requires a minimum fluid flow giving preference to the flow from a primary source while routing excess flow from a secondary source to a secondary outlet.

BACKGROUND ART

The Assignee of the present invention manufactures electrical power generating systems for airframes which convert a variable speed shaft output from a propulsion engine into a constant speed output drive which drives a three phase alternator to produce 400 Hz. electrical power. These systems are known as integrated drive generators. Integrated drive generators require a minimum fluid flow of oil for proper operation. Operation of an integrated drive generator with a supply of oil below the minimum flow for a significant time interval can cause catastrophic failure or serious damage.

FIG. 1 illustrates a prior art diagram showing the oil circulation circuit of an integrated drive generator of the type manufactured by the Assignee, such as used in the Assignee's model 75EGS01I integrated drive generator. The oil circulation system 10 includes an integrated drive generator 12 having an oil input 14 and an oil output 16. The construction and operation of integrated drive generators are well known and described in numerous patents of the Assignee as is not part of the present invention. The output oil from output 16 of the integrated drive generator 12 flows to scavenge pump 18 through input 20. The oil flow 62 from output 22 of the scavenge pump 18 flows to a recirculation valve 23. Additionally, an aircraft mounted accessory drive 24 receives oil flowing from the recirculation valve 23 at an input 26. The aircraft mounted accessory drive 24 supplies shaft power to the integrated drive generator 12 in a well-known manner. A supply pump 28 is located within an oil reservoir 30 of the aircraft mounted accessory drive for pumping oil flow 60 to the recirculation valve 23.

The recirculation valve 23 is comprised of a first input 32 and a second input 34 which respectively receive oil pumped from the supply pump 28 and the scavenge pump 18. The recirculation valve 23 also has a first output 36 through which the minimum critical supply of oil flows to the integrated drive generator 12. As stated above, the oil flow from the first output 36 must always be above a minimum oil flow rate in order to avoid serious damage or catastrophic failure of the integrated drive generator 12. The recirculation valve 23 also has a second output 38 which applies oil to the input 26 of the aircraft mounted accessory drive 24. Flow path 40 indicates the operation of the recirculation valve to recirculate oil under normal operation from the output 22 of the scavenge pump 18 through the second output 38 to the input 26 of the aircraft mounted accessory drive 24. In this circumstance, all of the oil outputted from the aircraft mounted accessory drive is pumped by the head produced by supply pump 28 through the input 32 of the recirculation valve 23 and to the first output 36 of the recirculation valve to the input 14 of the integrated drive generator 12 to satisfy the minimum oil flow requirement. As will be described in more detail below, assuming that the quantity of oil provided by the flow from the aircraft mounted accessory drive 24 through the input 32 is interrupted, oil is shunted from the input 34 of the recirculation valve 23 under the head produced by scavenge pump 18 to the first output 36 of the recirculation valve 23 to the input 14 which, in all instances, is desirable and if not accomplished can cause undue wear or damage. The foregoing operational modes are described in more detail in FIGS. 2–4 which illustrate specific operational modes of the oil circulation system 10 of FIG. 1.

FIG. 2 illustrates a normal mode of operation of the recirculation valve 23 when all of the minimum oil flow requirement of the integrated drive generator 12 is satisfied from oil flowing from the aircraft mounted accessory drive 24 through the first input 32 to the first output 36. The recirculation valve 23 has a valve stem 50 which moves within valve body 52 between a first position and a second position with the second position being illustrated in FIG. 2. The valve body is biased by a spring 54 to the first position as illustrated in FIG. 3. The pressure of the pumped oil produced by the supply pump 28 is applied to a first face 56 of the valve stem and the pressure of the oil pumped by the scavenge pump 18 is applied to a second face 58 and a third face 58'. As is apparent, the relative surface areas of the third face 58' and the second face 58 are such that they apply no net force to the valve stem 50. The valve stem position is unaffected by pressure produced from the scavenge pump 18 and is determined by the bias spring 54 and the pressure produced by the supply pump 28. The oil flow paths 60 and 62, respectively illustrate the flow of oil between the first input 32 and the first output 36 and the second input 34 and the second output 38.

The recirculation valve 23 has a first port 62' in fluid communication with the first input 32 for receiving oil from the first input 32. Oil flows through the first port 62 into a first chamber 64 and out through a second port 66 in fluid communication with the first output 36. Oil flows from the second input 34 through a first port 68 in fluid communication with a second chamber 70 out through a second port 72 in fluid communication with the second output 38.

FIG. 3 illustrates the second mode of operation in which the minimum oil flow to the input 14 of the integrated drive generator 12 is satisfied totally from oil flowing from the output 22 of the scavenge pump 18 through the second input 34 out through port 100 to the first output 36 to the input 14 of the integrated drive generator 12. In this particular mode of operation, the force exerted by the spring 54 biases the valve stem 50 to the first position in which the face 56 of the valve stem is seated against the first port 62 to block the flow of oil 60 from the input 32 to the output 36. In this particular mode of operation, the pressure of the oil flow 60 outputted from the supply pump 28 drops sufficiently below the pressure required to overcome the force exerted on the valve stem 50 by the bias spring 54.

The first mode of operation, as illustrated in FIG. 2, is the ideal mode of operation in which the required minimum oil supply is from the aircraft mounted accessory drive 24 where it is cooled, filtered and routed to the inlet 14 of the integrated drive generator 12 through the first output 36 of the recirculation valve 23. FIG. 3 illustrates the alternative methodology for supplying the minimum flow to the inlet 14 of the integrated drive generator 12 in the absence of an oil supply from the aircraft mounted accessory drive 24 which is made up by the oil flow 62 outputted by the scavenge pump 18 pumping oil from the integrated drive generator 12. The modes of operation depicted in FIGS. 2 and 3 do not pose a problem of operation.

FIG. 4 illustrates an operational mode of transition between the fully open position of FIG. 2 in which all oil of the minimum oil flow to the input 14 of the integrated drive generator 12 from the first output 36 of the recirculation valve 23 is satisfied by oil pumped from the aircraft mounted accessory drive 24 through the input 32 and the closed position of FIG. 3, in which all oil of the minimum flow pumped to the input 14 of the integrated drive generator 12 from the first output 36 of the recirculation valve 23 is satisfied by oil pumped from the scavenge pump 22 through the input 34. In the transition mode, the position of the valve stem 50 between the first position as illustrated in FIG. 3 and the second position as illustrated in FIG. 2, respectively, is controlled solely by the pressure of the oil flow 60 at the first input 32 and is insensitive to the output pressure of the oil flow 62 from the scavenge pump 18. When the recirculation valve 23 is operating in the fully open position as illustrated in FIG. 2, and the pressure of the oil flow 60 drops below that required to exert sufficient force on the face 56 of the valve stem 50 to overcome the force exerted by the spring 54 at the fully open position, the valve stem moves to the left as illustrated in FIG. 4. This creates an additional drop in the oil pressure at the inlet 14 of the integrated drive generator 12 because the flow path through the valve 23 from the inlet 34 and the inlet 32 through the outlet 38 to the reservoir 30 of the aircraft mounted accessory drive experiences substantially less flow resistance to the reservoir 30 than the flow resistance to enter the integrated drive generator 12 through outlet 36. This produces a distinct drop in the net flow to the integrated drive generator 12 through the input 14 through the first output 36 thereby partially starving the integrated drive generator of the requisite oil supply below the required minimum flow rate. The valve stem 50 dwells in the intermediate position until either the force from the oil flow 60 applied to the face 56 drops below the force exerted by the spring 54 at the valve closed position of FIG. 3 or, where the flow to the reservoir 30, a combination of flow from the scavenge pump 18 and the flow from the aircraft mounted accessory drive 24 is large enough to generate a back pressure to the supply 28 sufficient to raise the pressure applied to the face 56 to compress the spring 54 to restore it to the fully open position as illustrated in FIG. 2. It takes a relatively small change (increase or decrease) in the oil flow 60 through the inlet 32 to move the valve stem 50 into the transition range, but a substantially larger change in flow 60 to achieve transition to either the fully closed position or the fully open position.

In actual practice, operation of an integrated drive generator can occur below a rated pressure, such as 100 psi minimum, but above a pressure which is indicative of an oil interruption mode of operation. This mode of operation corresponds to that illustrated in FIG. 4 in which the overall flow and pressure of oil to the input 14 is representative of a starvation condition below the minimum required flow rate. It is necessary to avoid damage to integrated drive generators to prevent the operational mode of the transitional nature, as illustrated in FIG. 4, because of a significant possibility of increased wear or failure resultant from starvation of the integrated drive generator parts from the condition below the minimum oil pressure flow, such as the minimum 100 psi pressure, required on some integrated drive generators manufactured by the Assignee of the present invention.

DISCLOSURE OF INVENTION

The present invention is a fluid circulation system, a method of circulating fluid to a first fluid utilizing device requiring a minimum fluid flow and to a second fluid utilizing device using a valve and a fluid control valve in which the flow of fluid to the first fluid utilizing device is always supplied at least at the minimum fluid level necessary to sustain operation without damage or failure. With the invention, when the minimum fluid flow is not available from the preferred source of fluid, a secondary source of fluid is used to provide additional fluid flow to bring the fluid flow level up to at least the minimum fluid flow with any remaining fluid flow flowing to a second fluid utilizing device. A preferred application of the present invention is for oil circulation systems with a preferred oil circulation system being electrical power generating systems containing an integrated drive generator and an aircraft mounted accessory drive such as the type manufactured by the Assignee of the present invention. However, it should be understood that the invention is not limited thereto.

Because the surface areas of the opposed faces of the first element are equal, no pressure differential exists between the first and second chambers which eliminates the transitional mode of FIG. 4 of the prior art. This insures that all of the primary fluid supply to the fluid utilizing device having the minimum flow requirement is used and is not shunted to the second fluid utilizing device.

In accordance with the present invention, the valve 23 of the prior art as illustrated in FIGS. 2–4 is modified to split the valve stem therein into first and second elements which respectively move within first and second chambers between first and second positions to control the flow of fluid inputted from the first and second inputs such that the first output always receives at least the minimum flow rate. This is accomplished by using the flow from the preferred source in its entirety with the additional flow to meet minimum flow requirements at the first output coming from the second input with any remaining fluid flow from the second input flowing to a second output. The valve body of the present invention contains the same ports and inputs as the prior art of FIGS. 1–4 and differs from the prior art in using feedback of the pressure of the fluid from the second input in conjunction with the pressure of the first input to determine the position of the first element within the first chamber between the first and second positions, which respectively represent an open and closed condition, to control the quantity of the additional fluid flow from the second input to the first output dependent upon the relative position of the first element between the first and second positions in the first chamber. The intermediate position of the first element within the first chamber controls the degree of blocking of the port connecting the first input to the first output. Furthermore, the degree of flow through the second input and a first port in a second chamber in fluid communication with the second input to a second port in fluid communication with the second output supplies fluid to the second output with the second port being in fluid communication with the second chamber when the second element is in the first position. The second port of the second chamber is open when the second element is in the second position and supplies the excess fluid flow when the second element is in between the first and second positions. A third port in the second chamber in fluid communication with the first output supplies the additional fluid flow representing the deficiency in the fluid flow from the first input to the first output from fluid flowing in the second input. As the first element moves from the first position to the second position, the quantity of fluid flowing from the first input to the first output proportionally increases. As the second element moves from the first position to the second position, the quantity of additional fluid flowing from the second input to the first output decreases in proportion to the increase of the remaining fluid flow which is diverted from the first output to the second output. Preferably, the first and second chambers are coaxial.

BRIEF DESCRIPTION OF THE DRAWINGS

Like reference numerals identify like parts throughout the drawings.

BEST MODE FOR CARRYING OUT THE INVENTION

Figure 1:
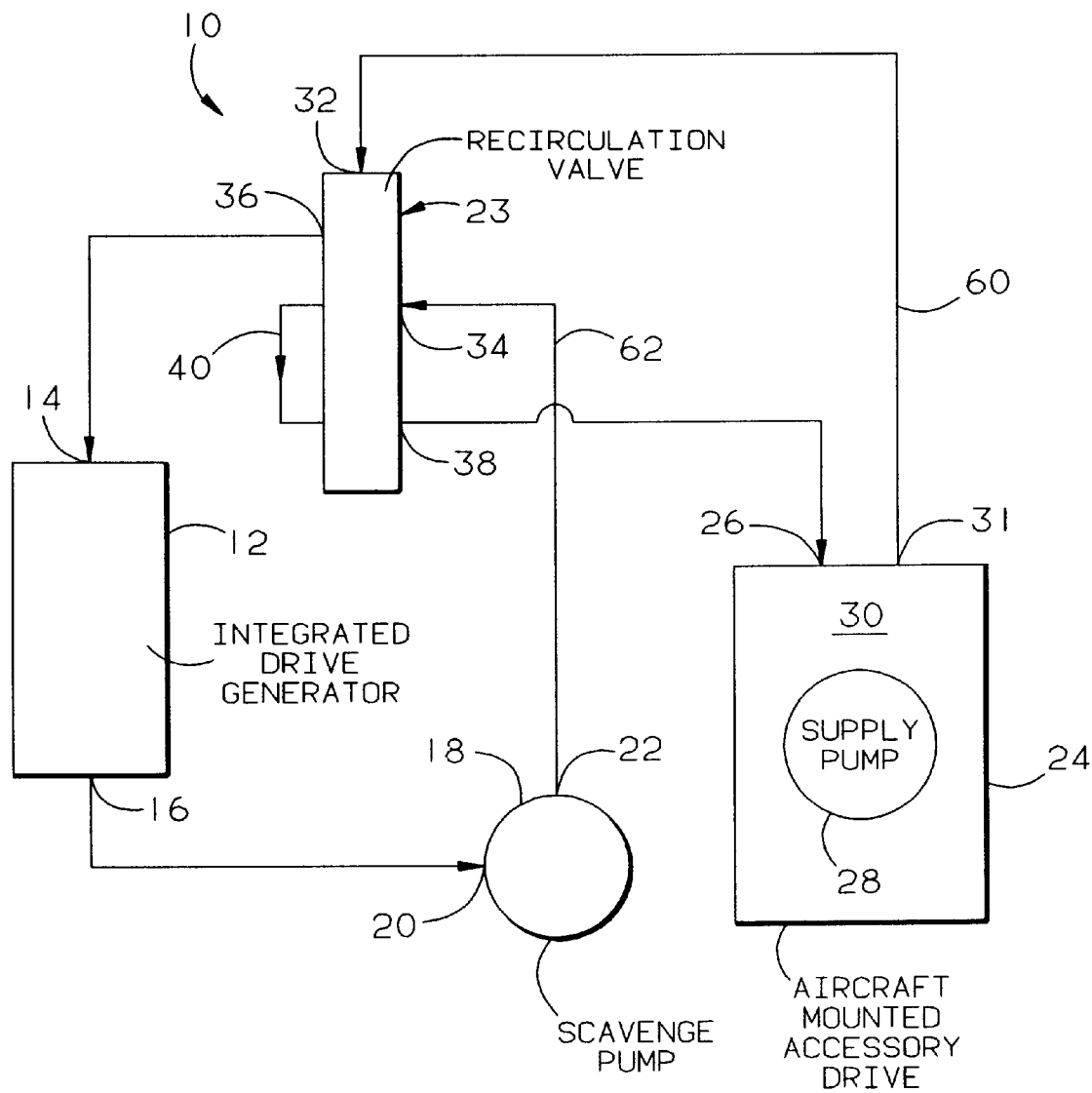
FIG. 1 illustrates a schematic diagram of a prior art oil circulation system of the Assignee.

The preferred embodiment of the present invention is in an electrical power generating system as illustrated in FIG. 1 as described above but it should be understood that the present invention is not limited to the control of oil flow and has other applications where a critical minimum flow must be provided at all times to one fluid utilizing device with the minimum flow rate being satisfied by additional oil diverted from flow to a second fluid utilizing device, which does not have a minimum flow requirement, to the first fluid utilizing device to avoid damage or failure consequent from sustained flow rates to the first fluid utilizing device below the minimum fluid flow.

Figure 2:
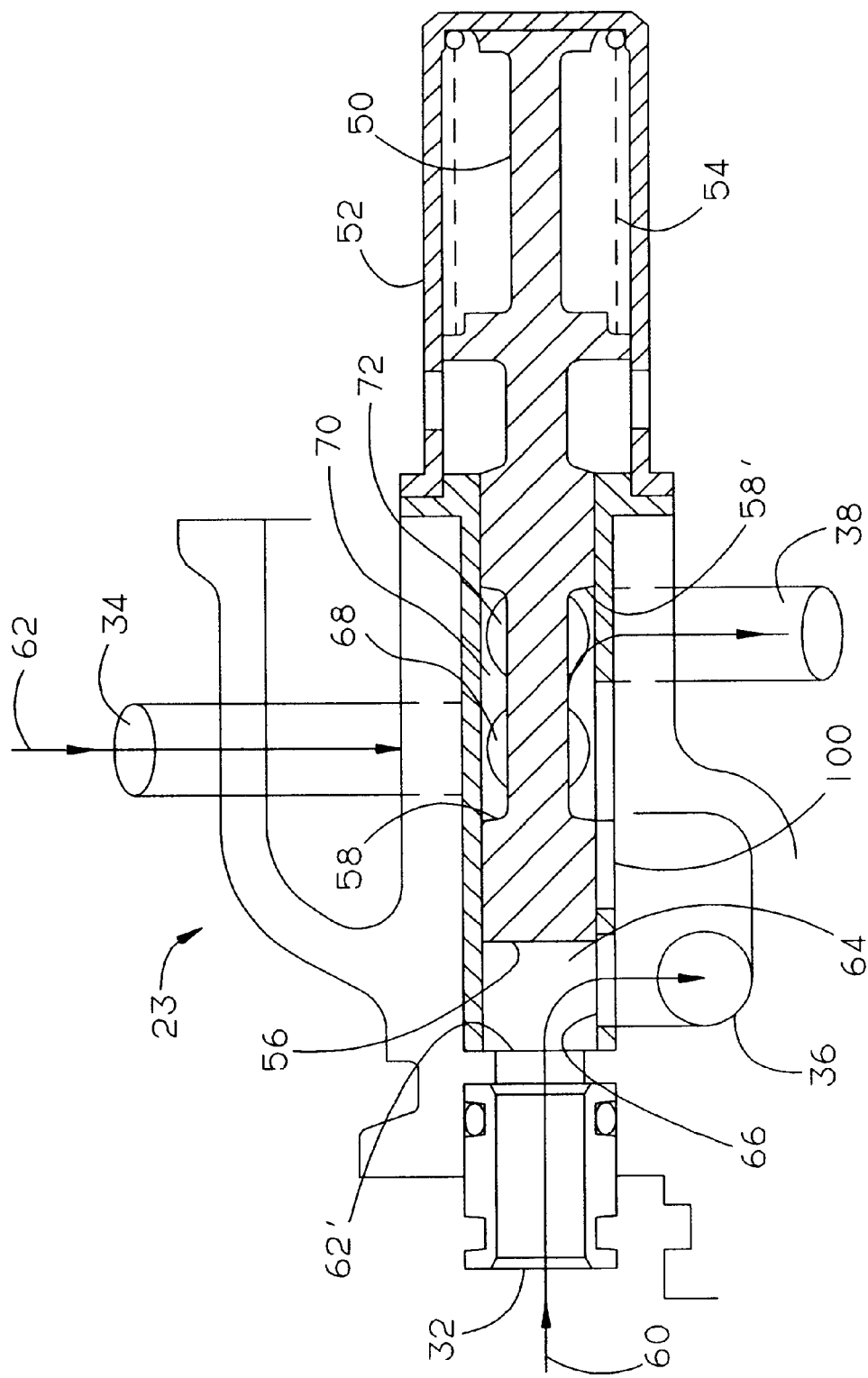
FIG. 2 illustrates a sectional view of the recirculation valve of FIG. 1 with the oil flow to the integrated drive generator being supplied from oil flow from the aircraft mounted accessory drive.
Figure 3:
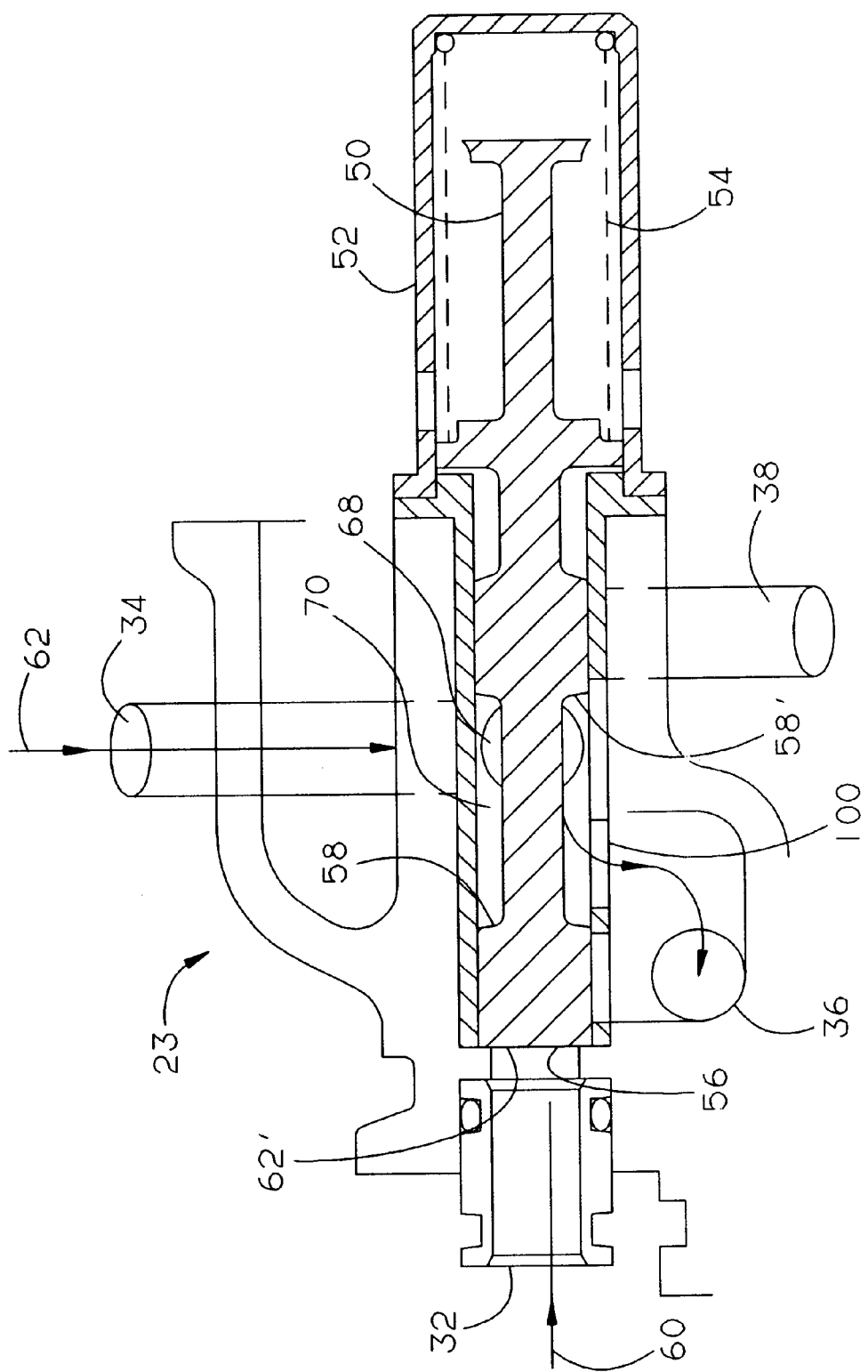
FIG. 3 illustrates a sectional view of the recirculation valve of FIG. 1 with the oil flow to the integrated drive generator being totally supplied from oil flow outputted by the integrated drive generator.
Figure 4:
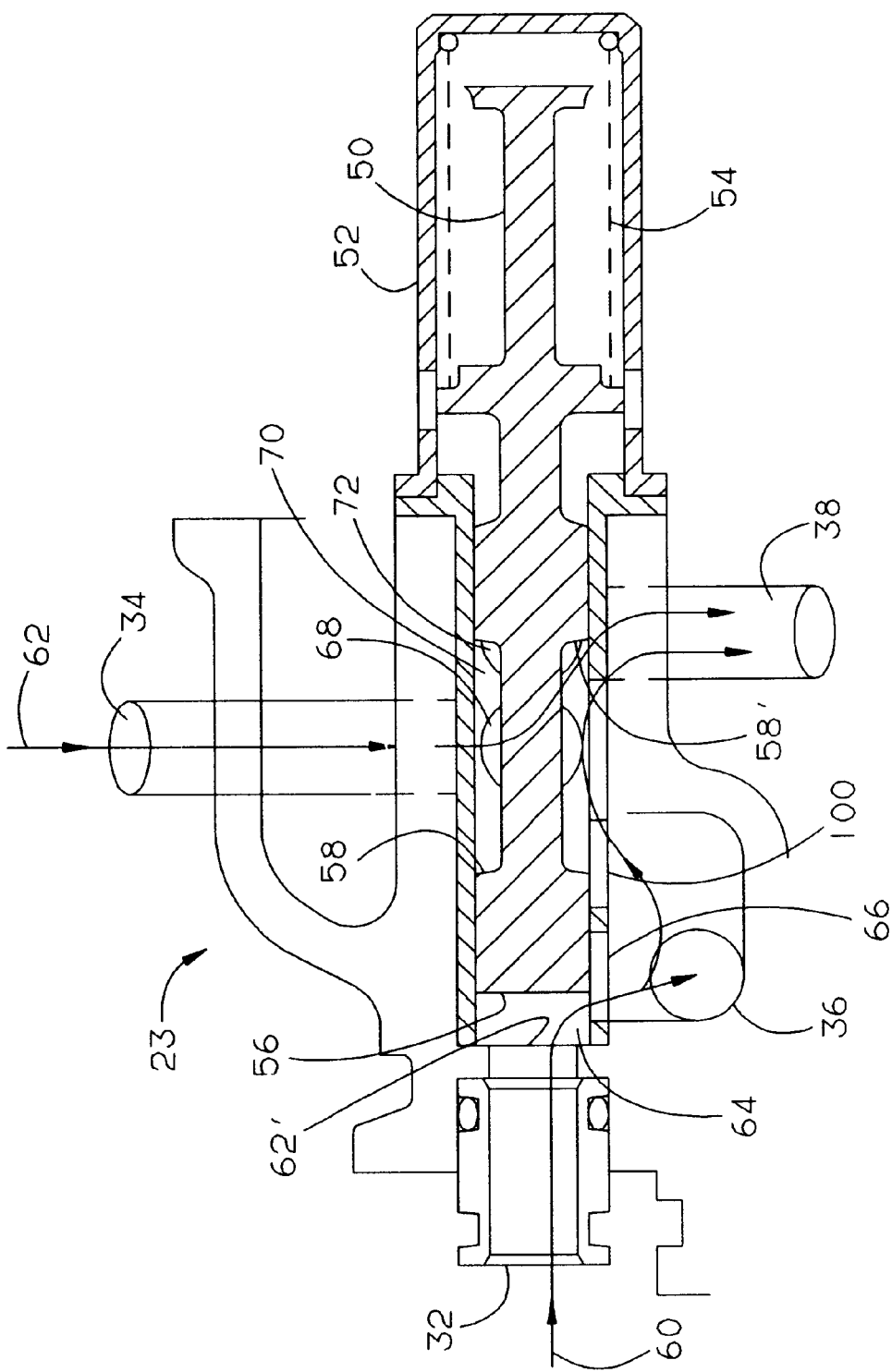
FIG. 4 illustrates a sectional view of the recirculation valve of FIG. 1 in a transitional mode in which the oil flow to the integrated drive generator is from the aircraft mounted accessory drive and at a rate below the minimum flow rate required for the integrated drive generator in view of partial diversion of oil flow from the aircraft mounted accessory drive, as well as the flow outputted by the integrated drive generator, to the aircraft mounted accessory drive.
Figure 5:
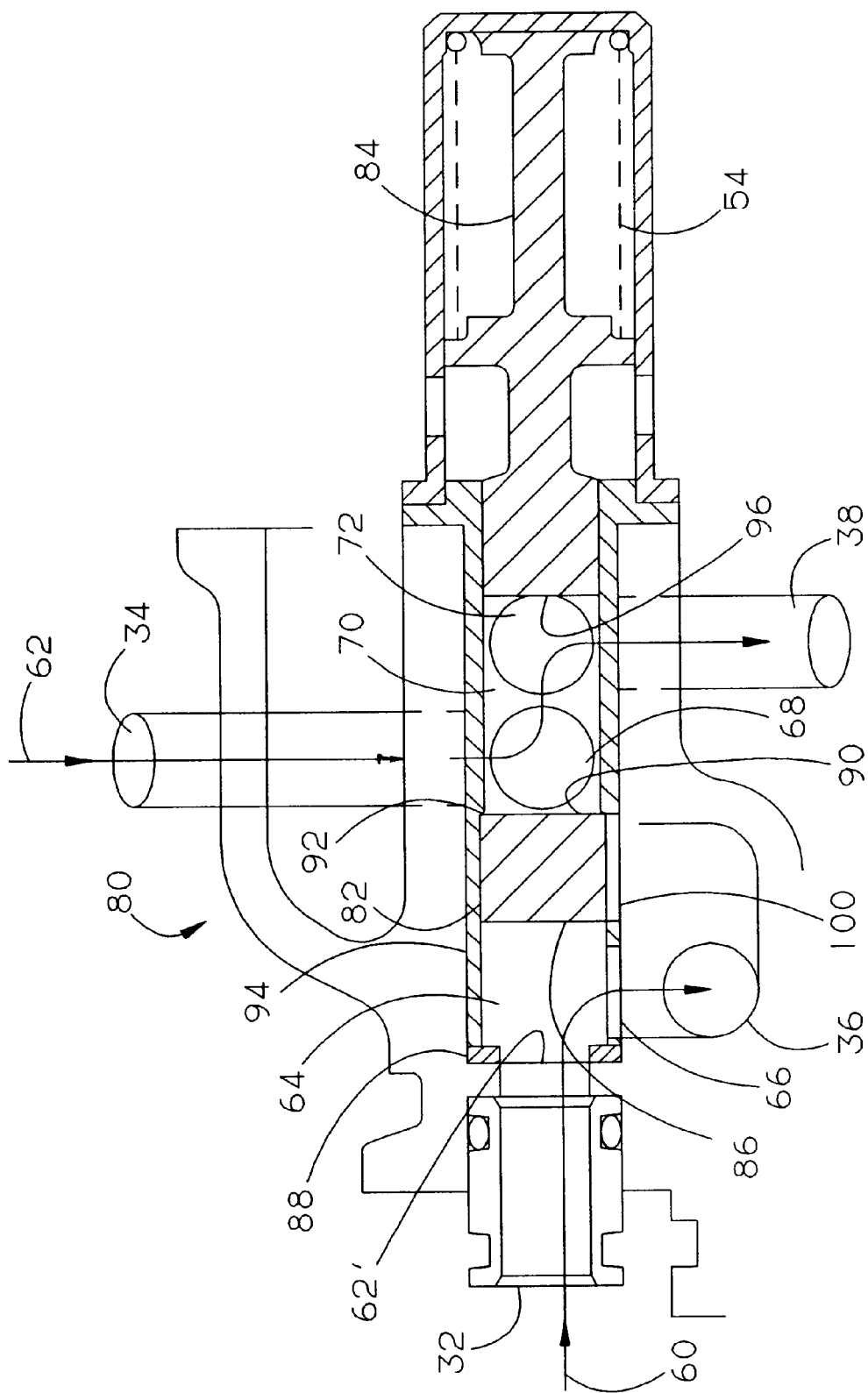
FIG. 5 illustrates a sectional view of an oil recirculation valve in accordance with the present invention with oil flow to the integrated drive generator being provided solely from the aircraft mounted accessory drive and oil flow to the aircraft mounted accessory drive being supplied solely from the integrated drive generator.
Figure 6:
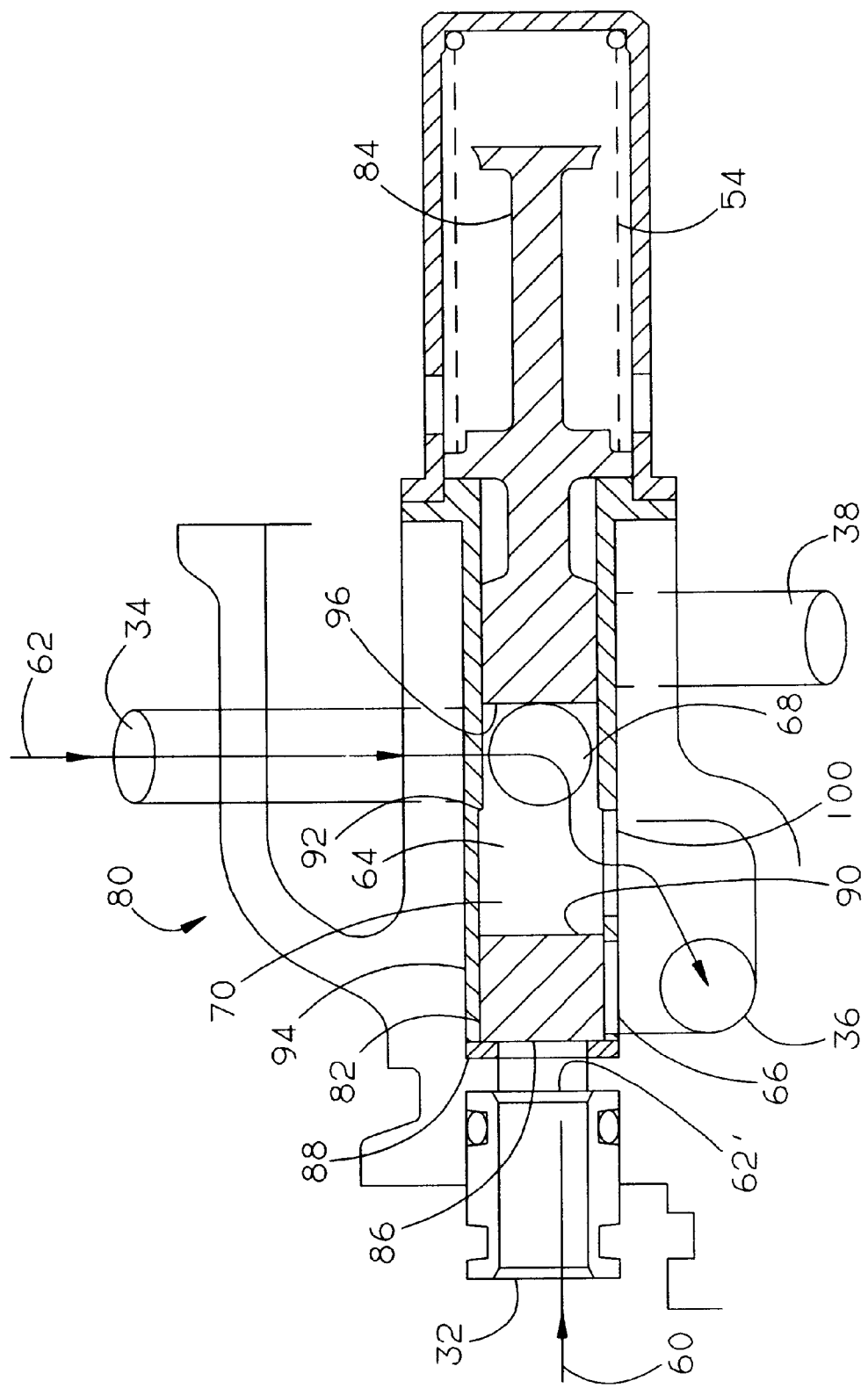
FIG. 6 illustrates a sectional view of the recirculation valve in accordance with the present invention with oil flow to the integrated drive generator being totally supplied from the integrated drive generator.
Figure 7:
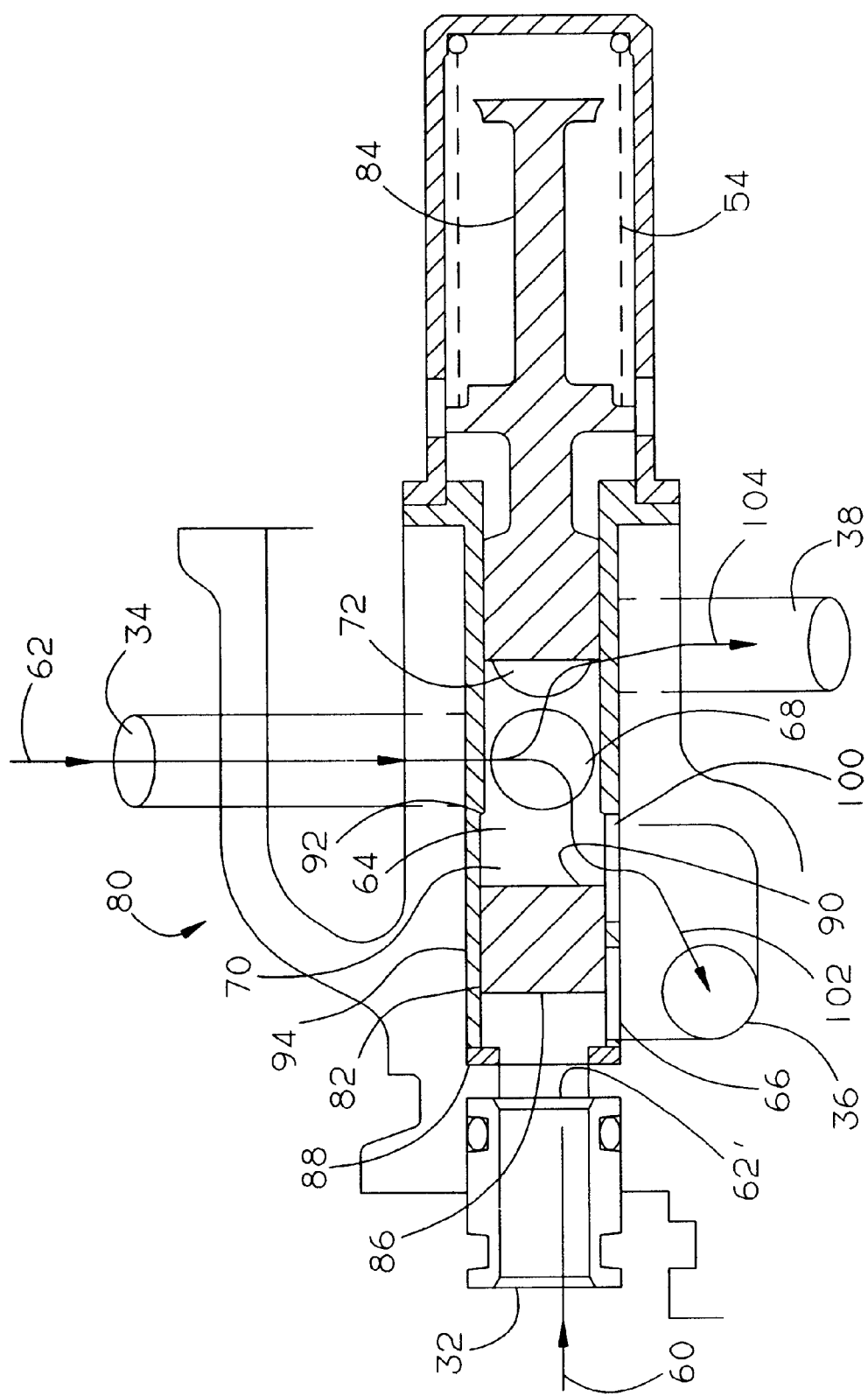
FIG. 7 illustrates a sectional view of an oil recirculation valve in accordance with the present invention in which the first and second elements are positioned respectively between their first and second positions in the first and second chambers causing the minimum oil flow to the first output to be provided from the first input and the second input with the deficiency of oil, not provided from the first input, being supplied from the second input and the remaining oil flow of the second input flowing to the second output.

FIGS. 5–7 respectively illustrate sectional views of an oil recirculation valve 70 in accordance with the invention which correspond respectively operationally to the prior art sectional views of FIGS. 2–4. FIG. 5 illustrates the normal operation mode in which fluid flow to the first output 36, which has the critical minimum flow, is satisfied solely from oil flow 60 to the first input 32. FIG. 6 illustrates the oil flow to the first output 36 which is satisfied solely from oil flow 62 to the second input 34 with the first input 32 being totally blocked. FIG. 7 illustrates the transitional mode in which the required minimum flow to the first output 36 is satisfied partially from the fluid flow 60 to the first input 32 and partially from additional flow 102 from the fluid flow 62 through the second input 34 with the remaining fluid flow 104 to the second input flowing to the second output 38.

Structurally, the valve 80 is similar to the prior art valve 23 of FIGS. 2–4 with the exception that the valve stem of the prior art has been split into a first movable element 82 and a second movable element 84 which respectively move between first and second positions in the valve body 52 and stops 88 and 92 have been provided to limit travel of the first movable element 82. The stop 88 is removable for assembly purposes. The first element 82 is movable within the first chamber 64 between a first position at which a first opposed surface 86 contacts the first stop 88 which defines the first position in the first chamber and a second position at which a second opposed face 90 contacts the second stop 92 at the second position. The stops 88 and 92 are defined by annular ridges which have a diameter slightly smaller than the outside diameter of the wall 94 which defines the first chamber 64 in the valve body 52. The second movable element 84 is biased to the first position in chamber 70 by spring 54 and opposes a force applied by pressure in the second oil flow 62 through the second input 34 as applied to face 96. The input port 68 and output ports 72 and 100 of the recirculation valve 80 are unchanged from the prior art of FIGS. 2–4.

FIG. 5 illustrates the normal mode of operation in which oil flow 60 from the aircraft mounted accessory drive 24 enters the first input 32, flows through the first port 62 into the first chamber 64 and out through the second port 66 to the first output 36. In this mode of operation, the pressure in the oil flow 60 exceeds the pressure in the feedback oil flow 62 which causes the first element 82 to assume the second position as illustrated in FIG. 5. The relative greater pressure of the flow 60 in comparison to the flow 62 is applied to the equal surface areas of the opposed faces 86 and 90 which causes the first element 82 to assume the second position as illustrated in FIG. 5. The hysteresis of the transitional mode of FIG. 4 is eliminated. Furthermore, the feedback pressure in the second flow 62 applied to the face 96 of the second element 84 is greater than the force applied by the spring 54 which forces the second element to assume the second position as illustrated in FIG. 5.

FIG. 6 illustrates the recirculation valve 80 in the mode of operation in which the oil flow to the first output 36 is totally supplied from the second input 62. In this position, the first element 82 is in the first position in which the first input 32 is blocked off from the oil flow 60. The oil flow 62 from the integrated drive generator 12 flows through the second input 34 through the second port 68 into the second chamber 70, through a third port 100, to the first output 36 and then to the integrated drive generator. The second element 84 is positioned in the first position in the second chamber 70 which blocks off the second port 72 (illustrated in FIG. 5) to totally divert the fluid flow 62 from the second output 38, as illustrated in FIG. 5, to the first output 36. In this mode, the pressure of the first flow 60 is less than the second flow 62 which causes the first element 82 to assume the first position and the force generated by the flow 62 as applied to the face 96 is less than the force generated by the spring 54 causing the second element to assume the first position.

FIG. 7 illustrates the transitional mode of operation of the recirculation valve 80 of the present invention which solves the problems of the prior art as illustrated in FIG. 4. At all times the minimum required flow rate of oil to the first output 36 is maintained even when the flow rate of the oil flow 60 from the aircraft mounted accessory drive 23 is insufficient to satisfy the minimum flow requirement of the integrated drive generator 12 to maintain trouble free and non-damaging operation. In this mode of operation, the oil flow 62 from the integrated drive generator is split into two flows 102 and 104 which respectively are the additional flow required to supplement the deficiency of flow provided by the first oil flow 60 to provide the minimum flow rate through the output 36 and the remaining oil flow which flows to the aircraft mounted accessory drive 24 which exceeds the oil flow which is required to be diverted to the first output to satisfy the minimum flow rate requirement therein.

As is seen from this mode of operation, the first fluid utilizing device at all times receives the minimum flow requirement which, in the preferred application, is oil, to prevent potential damage or destruction of the first fluid utilizing device. As a result, the feedback pressure of the second oil flow 62 is used to control the position of the first element 82 between the first position and the second position such that the additional oil flow 102 required to supplement the deficiency of oil flow below the minimum flow requirement provided by the first oil flow 60 is always provided from the second oil flow with the remaining oil flow 104 always being diverted to the aircraft accessory mounted drive 24. The position of the first element 86 between the first and second positions proportions the relative quantity of the additional flow 102 and the remaining flow 104 to satisfy the minimum flow requirement which makes up the oil flow 62 to always provide sufficient oil to the first output 36 which prevents damage to the integrated drive generator 12 of the prior art as described above in conjunction with FIGS. 1–4.

While the invention has been described in terms of a preferred embodiment in which a minimum oil flow is provided to a first device having a critical flow requirement, it should be understood that the invention has utility in other applications involving fluid flow where a minimum flow requirement to a first device is required and when a deficiency in fluid flow from a second fluid utilizing device is insufficient and fluid may be diverted to flow back from the first fluid utilizing device to provide additional fluid flow to supplement the deficiency in the minimum flow requirement provided by flow from the second fluid utilizing device. The valve of the present invention has applications wherever primary and secondary fluid sources and outlets are provided and preference for the primary outlet is required (i.e. flow back is not required). It should be understood that numerous modifications may be made to the invention without departing from the spirit and scope of the invention. It is intended that all such modifications fall within the scope of the appended claims.

I claim:

1. A fluid circulation system comprising:
   a first fluid utilizing device requiring a minimum fluid flow and having an input for receiving the minimum fluid flow and an output for discharging fluid received from the input;
   a second fluid utilizing device having an input for receiving fluid and an output for outputting fluid; and
   a valve having a first input for receiving the fluid flowing from the output of the second device, a first output for supplying the minimum fluid flow to the first device, a second input for receiving the fluid flowing from the output of the first device and a second output for supplying fluid to the second device wherein any deficiency in fluid flow below the minimum fluid flow flowing from the first input to the first output is supplied with additional fluid flow from the second input to the first output with any remaining fluid flow from the second input flowing to the second output.

2. A fluid circulation system in accordance with claim 1 wherein the valve comprises:
   a first element having opposed faces movable in a first chamber in the valve between first and second positions in response to fluid pressure applied respectively to the opposed faces from the first and second inputs with a position of the first element between the first and second positions being controlled by opposing forces applied by the fluid pressure at the first and second inputs and the position controlling the additional fluid flow flowing from the second input to the first output.

3. A fluid circulation system in accordance with claim 2 wherein the valve further comprises:
   a second element movable in a second chamber between first and second positions with fluid pressure in the second input being applied to a face of the second element against a force applied to the element by a spring biasing the second element toward the first position in opposition to a force applied by the fluid pressure applied to the face with a position of the second element between the first and second positions controlling splitting of fluid flow into the second input between the additional fluid flow and the remaining oil flow.

4. A fluid circulation system in accordance with claim 2 wherein the first chamber comprises:
   a first port in fluid communication with the first input for receiving fluid from the first input with the first port being blocked from fluid communication with the first chamber by the first element in the first position and being open to fluid communication with the first chamber at the second position; and
   a second port in fluid communication with the first output for supplying fluid to the first output with the second port being blocked from fluid communication with the first chamber by the first element in the first position and being open to fluid communication with the first element in the second position.

5. A fluid circulation system in accordance with claim 4 wherein:
   supplying of the additional fluid flow to the first output through the second port increases in flow rate as the first element moves toward the second position.

6. A fluid circulation system in accordance with claim 3 wherein the second chamber comprises:
   a first port in fluid communication with the second input for receiving fluid flowing from the second input;
   a second port in fluid communication with the second output for supplying fluid to the second output with the second port being blocked from being in fluid communication with the second chamber by the second element in the first position, the second port being open when the second element is in the second position and supplying the remaining fluid flow when the second element is in between the first and second positions; and a third port in fluid communication with the first output for supplying the additional fluid flow to the first output from fluid flowing through the second input.

7. A fluid circulation system in accordance with claim 6 wherein:

the additional fluid flow to the third port decreases as the second element moves from the first position toward the second position and the remaining flow increases as the second element moves from the first position toward the second position.

8. A fluid circulation system in accordance with claim 3 wherein:

the first and second chambers are coaxial.

9. A fluid circulation system in accordance with claim 6 wherein:

the first and second chambers are coaxial.

10. A fluid circulation system in accordance with claim 7 wherein:

the first and second chambers are coaxial.

11. A fluid circulation system in accordance with claim 1 wherein:

the fluid is oil;

the first device is an integrated drive generator in an electrical power generation system for an airframe; and the second device is an aircraft mounted accessory drive.

12. A fluid circulation system in accordance with claim 11 further comprising:

a scavenge pump having an input coupled to the output of the integrated drive generator and an output coupled to the second input of the valve for pumping oil from the integrated drive generator to the valve; and a supply pump contained within an oil reservoir of the aircraft mounted drive for pumping oil from the reservoir to the first input of the valve.

13. A method of circulating fluid to a first fluid utilizing device requiring a minimum fluid flow and to a second fluid utilizing device using a valve comprising:

receiving fluid through a first input of the valve from an output of the second fluid utilizing device;

supplying the minimum fluid flow to the first fluid utilizing device from a first output of the valve;

receiving the fluid flowing from an output of the first device from a second input of the valve;

supplying fluid from a second output of the valve to the second device; and supplying any deficiency in fluid flow below the minimum flow from the first input to the first output with additional fluid flow from the second input to the first output with any remaining fluid flow from the second input flowing to the second output.

14. A method in accordance with claim 13 wherein:

the fluid flow comprises oil.

15. A method in accordance with claim 14 wherein:

the first fluid utilizing device is an integrated drive generator in an electrical power generating system in an airframe and the second fluid utilizing drive is an aircraft mounted accessory drive; and a first pump pumps oil from the integrated drive generator to the second input of the valve and a second pump pumps oil from the aircraft mounted accessory drive to the first input.

16. A fluid control valve comprising:

a valve body having at least one chamber which contains a plurality of movable elements having surfaces responsive to fluid flow with the fluid flow exerting force on the surfaces to produce relative movement between the plurality of movable elements in the at least one chamber;

a first input in the valve body for receiving a first fluid flow;

a first output in the valve body for supplying a minimum fluid flow;

a second input in the valve body for receiving a second fluid flow; and a second output in the valve body for outputting a fluid flow; and wherein any deficiency in fluid flow flowing from the first input to the first output and the second fluid flow producing the relative movement of the plurality of movable elements which causes an additional fluid flow from the second fluid flow received by the second input to the first output with any remaining fluid flow from the second input flowing to the second output.

17. A valve in accordance with claim 16 wherein one of the plurality of movable elements comprises:

a first element having opposed faces movable in a first chamber in the valve between first and second positions in response to fluid pressure applied respectively to the opposed faces from the first and second inputs with a position of the first element between the first and second positions being controlled by opposing forces applied by the fluid pressure at the first and second inputs and the position controlling the additional fluid flow flowing from the second input to the first output.

18. A valve in accordance with claim 17 wherein another one of the plurality of movable elements comprises:

a second element movable in a second chamber between first and second positions with fluid pressure in the second input being applied to a face of the second element against a force applied to the element by a spring biasing the second element toward the first position in opposition to a force applied by the fluid pressure applied to the face with a position of the second element between the first and second positions controlling splitting of fluid flow into the second input between the additional fluid flow and the remaining fluid flow.

19. A valve in accordance with claim 17 wherein the first chamber comprises:

a first port in fluid communication with the first input for receiving fluid from the first input with the first port being blocked from fluid communication with the first chamber by the first element in the first position and being open to fluid communication with the first chamber at the second position; and a second port in fluid communication with the first output for supplying fluid to the first output with the second port being blocked from fluid communication with the first chamber by the first element in the first position and being open to fluid communication with the first element in the second position.

20. A valve in accordance with claim 19 wherein:

supplying of the additional fluid flow to the first output through the second port increases in flow rate as the first element moves toward the first position.

21. A valve in accordance with claim 18 wherein the second chamber comprises:

a first port in fluid communication with the second input for receiving fluid from the second input;

a second port in fluid communication with the second output for supplying oil to the second output with the second port being blocked from being in fluid communication with the second chamber by the second element in the first position; and a third port in fluid communication with the first output for supplying the additional fluid flow to the first output from fluid flowing through the second input and being blocked when the first element is in the second position.

22. A valve in accordance with claim 21 wherein;

the additional fluid flow to the third port decreases as the second element moves from the first position toward the second position and the remaining flow increases as the second element moves from the first portion toward the second position.

23. A valve in accordance with claim 18 wherein:

the first and second chambers are coaxial.

* * * * *